United States Patent
Mu

(10) Patent No.: US 12,328,716 B2
(45) Date of Patent: Jun. 10, 2025

(54) METHOD FOR TRANSMITTING HYBRID AUTOMATIC REPEAT REQUEST ACKNOWLEDGEMENT INFORMATION, APPARATUS, AND STORAGE MEDIUM

(71) Applicant: BEIJING XIAOMI MOBILE SOFTWARE CO., LTD., Beijing (CN)

(72) Inventor: Qin Mu, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 414 days.

(21) Appl. No.: 17/686,393

(22) Filed: Mar. 3, 2022

(65) Prior Publication Data

US 2022/0191897 A1     Jun. 16, 2022

Related U.S. Application Data

(63) Continuation of application No. PCT/CN2019/104792, filed on Sep. 6, 2019.

(51) Int. Cl.
| | |
|---|---|
| *H04W 72/1263* | (2023.01) |
| *H04L 1/08* | (2006.01) |
| *H04L 1/1812* | (2023.01) |
| *H04L 5/00* | (2006.01) |
| *H04W 72/0446* | (2023.01) |
| *H04W 72/12* | (2023.01) |

(52) U.S. Cl.
CPC ........... *H04W 72/1263* (2013.01); *H04L 1/08* (2013.01); *H04L 1/1812* (2013.01); *H04L 5/0053* (2013.01); *H04W 72/0446* (2013.01); *H04W 72/1221* (2013.01)

(58) Field of Classification Search
None
See application file for complete search history.

(56) References Cited

U.S. PATENT DOCUMENTS

| | | | |
|---|---|---|---|
| 10,396,941 B2 | 8/2019 | Khoryaev et al. | |
| 2018/0060664 A1 | 4/2018 | Khoryaev et al. | |
| 2018/0324787 A1* | 11/2018 | Yin | ........................ H04L 5/0053 |

(Continued)

FOREIGN PATENT DOCUMENTS

| | | |
|---|---|---|
| CN | 107431557 A | 12/2017 |
| CN | 110034892 A | 7/2019 |

(Continued)

OTHER PUBLICATIONS

International Search Report of PCT/CN2019/104792 dated Jun. 4, 2020 with English translation, (4p).

(Continued)

*Primary Examiner* — Christopher T Wyllie
(74) *Attorney, Agent, or Firm* — Arch & Lake LLP

(57) ABSTRACT

Methods and apparatuses for transmitting HARQ-ACK information are provided. The method is implemented by a network device and includes: determining that a time domain resource conflict exists between transmitting a first service type of HARQ-ACK information codebook and transmitting a second service type of data information; and sending a scheduling instruction configured to instruct a retransmission of the HARQ-ACK information codebook, in which the scheduling instruction includes resource information for retransmitting the HARQ-ACK information codebook.

19 Claims, 9 Drawing Sheets a scheduling instruction configured to instruct a retransmission of a HARQ-ACK information codebook is received, in which the scheduling instruction includes resource information for retransmitting the HARQ-ACK information codebook    S21 the HARQ-ACK information codebook is retransmitted on resources indicated by the scheduling instruction    S22

(56) References Cited

U.S. PATENT DOCUMENTS

| | | | | |
|---|---|---|---|---|
| 2019/0045546 A1* | 2/2019 | Li | ............ | H04L 5/0073 |
| 2021/0058945 A1* | 2/2021 | Zhang | ............ | H04L 1/1822 |
| 2021/0314102 A1* | 10/2021 | Li | ............ | H04L 1/1614 |
| 2022/0191897 A1* | 6/2022 | Mu | ............ | H04W 72/1221 |

FOREIGN PATENT DOCUMENTS

| | | |
|---|---|---|
| CN | 110034893 A | 7/2019 |
| CN | 110166207 A | 8/2019 |
| WO | 2013162185 A1 | 10/2013 |

OTHER PUBLICATIONS

Extended European Search Report of EP Application No. 19944092.6 dated May 30, 2023, (13p).

MediaTek Inc., "Multiple HARQ procedures and intra-UE UCI prioritization", 3GPP TSG RAN WG1 Meeting #97, R1-1907724, Reno, Nevada, May 13-17, 2019, (12p).

OPPO, "UCI enhancements for URLLC", 3GPP TSG RAN WG1 #97, R1-1906448, Reno, NV May 13-17, 2019, (8p).

OPPO, "UCI enhancements for URLLC", 3GPP TSG RAN WG1 #98, R1-1908668, Prague, CZ, Aug. 26-30, 2019, (7p).

* cited by examiner time domain conflict occurs between PUCCH resources occupied by eMBB HARQ-ACK information codebook and resources occupied by URLLC PUSCH time domain conflict occurs between PUCCH resources occupied by eMBB HARQ-ACK information codebook and resources occupied by HARQ-ACK information of URLLC

METHOD FOR TRANSMITTING HYBRID AUTOMATIC REPEAT REQUEST ACKNOWLEDGEMENT INFORMATION, APPARATUS, AND STORAGE MEDIUM

CROSS-REFERENCE TO RELATED APPLICATION

The present application is a continuation application of PCT Application No. PCT/CN2019/104792, filed on Sep. 6, 2019, the entire content of which is incorporated herein by reference for all purposes.

TECHNICAL FIELD

This application relates to a field of communication technologies, and in particular, to a method, an apparatus and a storage medium for transmitting HARQ-ACK information.

BACKGROUND

Hybrid Automatic Repeat ReQuest (HARQ) technology is general feedback technology in wireless communication systems. In the HARQ technology, after receiving the physical downlink shared channel (PDSCH) of the downlink service data sent by the network device, the terminal will send Hybrid Automatic Repeat ReQuest Acknowledgement (HARQ-ACK) information of the PDSCH, so that the network device may determine whether to re-schedule the downlink service data or to schedule new downlink service data to the user terminal.

In the related art, when the same terminal has multiple service types concurrently, a time domain resource conflict between the transmission resources (data information or control information) of the high-priority service data and the transmission resources of the low-priority HARQ-ACK may occur. At this time, in order to protect the transmission of service data, the HARQ-ACK will be punctured or discarded. For the HARQ-ACK that is punctured or discarded, the PDSCH is subsequently retransmitted to ensure reliability.

In general, HARQ-ACK information is transmitted in a form of a HARQ-ACK codebook. The HARQ-ACK codebook is formed by concatenating and combining HARQ-ACK information bits of one or more PDSCHs. In actual transmission, a HARQ-ACK codebook is likely to be HARQ-ACK information bits of multiple PDSCHs combined into one HARQ-ACK codebook to be transmitted. If the HARQ-ACK codebook is punctured or discarded, a large number of PDSCH retransmissions will be caused.

SUMMARY

The present disclosure provides methods and apparatuses for transmitting HARQ-ACK information.

According to a first aspect of the present disclosure, a method for transmitting HARQ-ACK information is provided. The method is implemented by a network device and includes: determining that a time domain resource conflict exists between a transmission of a first service type of HARQ-ACK information codebook and a transmission of a second service type of data information; and sending a scheduling instruction configured to instruct a retransmission of the HARQ-ACK information codebook, in which the scheduling instruction includes resource information for retransmitting the HARQ-ACK information codebook.

According to a second aspect of the present disclosure, a method for transmitting HARQ-ACK information is provided. The method is implemented by a terminal, and includes: receiving a scheduling instruction configured to instruct a retransmission of a HARQ-ACK information codebook, in which the scheduling instruction includes resource information for retransmitting the HARQ-ACK information codebook; and retransmitting the HARQ-ACK information codebook on resources indicated by the scheduling instruction.

According to a third aspect of the present disclosure, an apparatus for transmitting HARQ-ACK information is provided. The apparatus includes a processor; and a memory for storing instructions executable by the processor; in which, the processor is configured to determine that a time domain resource conflict exists between a transmission of a first service type of HARQ-ACK information codebook and a transmission of a second service type of data information; and send a scheduling instruction configured to instruct a retransmission of the HARQ-ACK information codebook, in which the scheduling instruction includes resource information for retransmitting the HARQ-ACK information codebook.

It is to be understood that the foregoing general descriptions and the following detailed descriptions are exemplary only and do not limit the present disclosure.

BRIEF DESCRIPTION OF THE DRAWINGS

The accompanying drawings, which are incorporated in and constitute a part of this specification, illustrate embodiments consistent with the disclosure, and serve to explain the principles of the present disclosure together with the descriptions.

DETAILED DESCRIPTION

Figure 1:
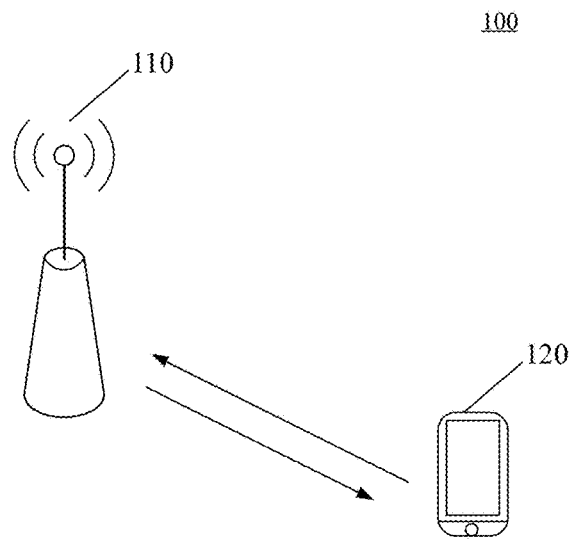
FIG. 1 is a schematic diagram of a wireless communication system according to some examples of the present disclosure.

Exemplary embodiments will be described in detail herein, examples of which are illustrated in the accompanying drawings. The following description refers to the drawings, the same numerals in different drawings refer to the same or similar elements unless otherwise indicated. The implementations described in the illustrative examples below are not intended to represent all implementations consistent with the present disclosure. Instead, they are merely examples of apparatus and methods consistent with some aspects of the present disclosure as recited in the appended claims.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

The technical solutions provided by the examples of the present disclosure may include the following beneficial effects: when it is determined that there is a time domain resource conflict between a transmission of a first service type of HARQ-ACK information codebook and a transmission of a second service type of data information, a scheduling instruction configured to instruct a retransmission of the HARQ-ACK information codebook is sent. The terminal retransmits the HARQ-ACK information codebook on resource information instructed by the scheduling instruction, thereby avoiding massive PDSCH retransmissions.

The method for transmitting HARQ-ACK information provided by the examples of the present disclosure may be applied to a wireless communication system 100 shown in FIG. 1. Referring to FIG. 1, the wireless communication system 100 includes a network device 110 and a terminal 120. The terminal 120 is connected to the network device 110 through wireless resources, and transmits and receives data.

It can be understood that the wireless communication system 100 shown in FIG. 1 is only a schematic illustration, and the wireless communication system 100 may also include other network devices, such as core network devices, wireless relay devices, and wireless backhaul devices. etc., not shown in FIG. 1. The examples of the present disclosure do not limit the number of network devices and the number of terminals included in the wireless communication system.

It can be further understood that the wireless communication system of the example of the present disclosure is a network that provides a wireless communication function. Wireless communication systems can use different communication technologies, such as code division multiple access (CDMA), wideband code division multiple access (WCDMA), time division multiple access (TDMA), frequency division multiple access (FDMA), orthogonal frequency-division multiple access (OFDMA), single Carrier FDMA (SC-FDMA), Carrier Sense Multiple Access with Collision Avoidance. Networks can be divided into 2G (generation in English) network, 3G network, 4G network or future evolution network, such as 5G network which is also be called a new Radio (NR) according to the capacity, speed, delay and other factors of different networks. For convenience of description, the present disclosure will sometimes refer to a wireless communication network simply as a network.

Further, the network device 110 involved in the present disclosure may also be referred to as a radio access network device. The wireless access network device may be: a base station, an evolved node B (base station), a home base station, an access point (AP) in a wireless fidelity (WIFI) system, a wireless relay node, a wireless backhaul node, a transmission point (TP) or a transmission and reception point (TRP), etc., can also be a gNB in an NR system, or can also be a component or part of a device that constitutes a base station and the like. When it is a vehicle-to-everything (V2X) communication system, the network device may also be an in-vehicle device. It should be understood that, in the examples of the present disclosure, the specific technique and specific device form adopted by the network device are not limited.

Further, the terminal 120 involved in the present disclosure may also be referred to as terminal equipment, user equipment (UE), mobile station (MS), mobile terminal (MT), etc, which is a device that provides voice and/or data connectivity to a user, for example, a terminal may be a handheld device with a wireless connection function, a vehicle-mounted device, or the like. At present, some examples of terminals are: smart mobile phone, Pocket Personal Computer (PPC), Personal Digital Assistant (PDA), notebook computer, tablet computer, wearable device, or on-board equipment, etc. In addition, when it is a vehicle-to-everything (V2X) communication system, the terminal device may also be an in-vehicle device. It should be understood that the examples of the present disclosure do not limit the specific technique and specific device form adopted by the terminal.

In FIG. 1, the terminal 120 communicates with the network device 110, and the process of the terminal 120 sending data to the network device 110 may be referred to as uplink transmission. The process of the network device 110 sending data to the terminal 120 may be referred to as downlink transmission. In the process of uplink transmission and downlink transmission between the terminal 120 and the network device 110, a Hybrid Automatic Repeat ReQuest (HARQ) feedback technology is used to ensure the reliability of transmission. For example, after receiving the Physical Downlink Shared Channel (PDSCH) of the downlink service data sent by the network device 110, the terminal 120 will feed back the acknowledgement (ACK) or non-acknowledgement (NACK) uplink feedback information corresponding to the PDSCH, so that the network device 110 can determine whether to reschedule the downlink service data or to schedule new downlink service data to the user terminal. The ACK and NACK uplink feedback information is collectively referred to as uplink Hybrid Automatic Repeat ReQuest Acknowledgement (HARQ-ACK) information.

In the related art, the terminal supports concurrent transmission of data of multiple service types. For example, when the terminal transmits data transmission of multiple service types concurrently, there will be a time domain conflict between the transmission resources of low-priority HARQ-ACK and the transmission resources (data information or control information) of high-priority service data. At this time, in order to protect the transmission of service data, the HARQ-ACK will be punctured or discarded. For the HARQ-ACK that is punctured or discarded, the PDSCH is subsequently retransmitted to ensure reliability. Usually HARQ-ACK information is transmitted in the form of a HARQ-ACK codebook. The HARQ-ACK codebook is formed by concatenating and combining HARQ-ACK information bits of one or more PDSCHs. In actual transmission, a HARQ-ACK codebook is likely to be HARQ-ACK information bits of multiple PDSCHs combined into one HARQ-ACK codebook to be transmitted. If the HARQ-ACK codebook is punctured or discarded, a large number of PDSCH retransmissions will be caused.

Figure 2:
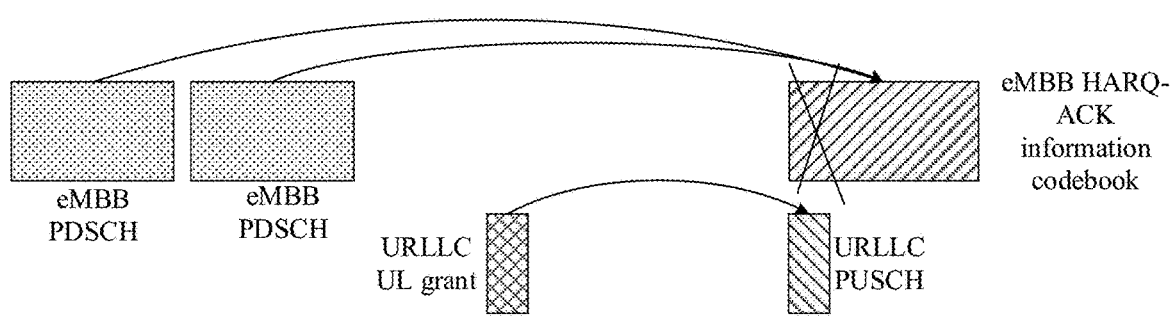
FIG. 2 is a schematic diagram showing a time domain resource conflict according to one or m examples of the present disclosure.
Figure 3:
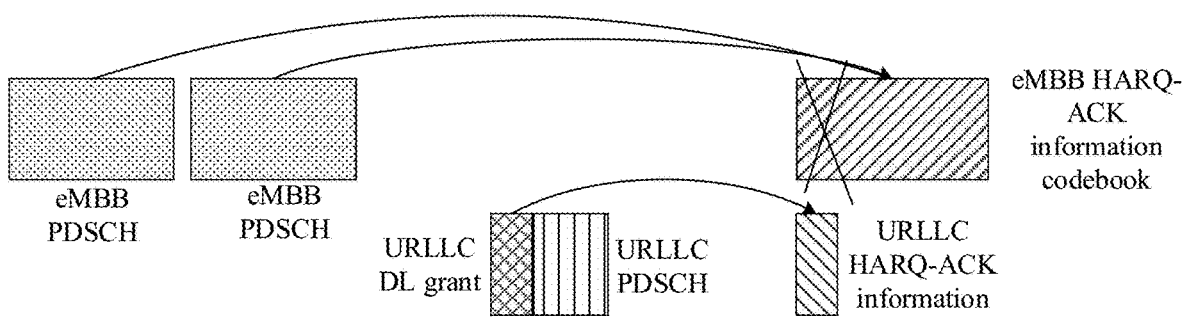
FIG. 3 is a schematic diagram showing a time domain resource conflict according to one or m examples of the present disclosure.
Figure 4:
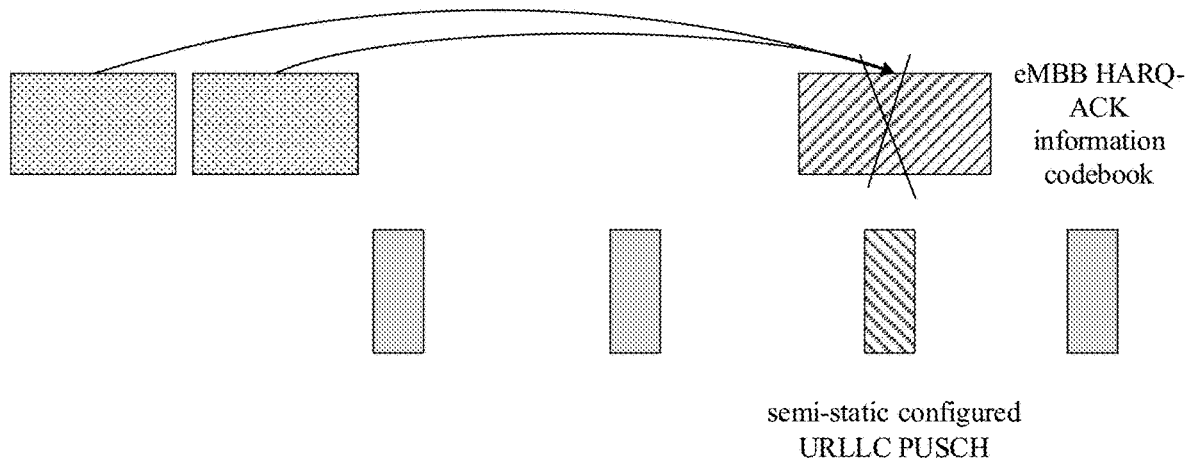
FIG. 4 is a schematic diagram showing a time domain resource conflict according to one or m examples of the present disclosure.
Figure 5:
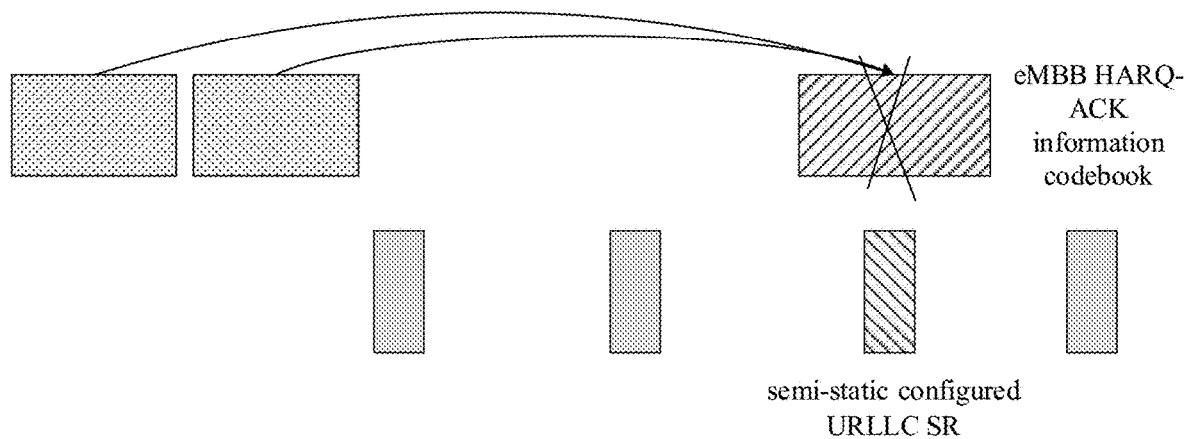
FIG. 5 is a schematic diagram showing a time domain resource conflict according to one or m examples of the present disclosure.

For example, in 5G NR, the terminal concurrently supports the Ultra Reliable Low Latency Communications (URLLC) service type and the Enhance Mobile Broadband (eMBB) service type. In this scenario, there may be a time-domain resource conflict between the transmission resources (data information or control information) of URLLC data and the transmission of eMBB HARQ-ACK. Schematic diagrams of time domain resource conflict are shown in FIG. 2, FIG. 3, FIG. 4 and FIG. 5. In FIG. 2, there is a time domain conflict between the Physical Uplink Control channel (PUCCH) resources occupied by the eMBB HARQ-ACK codebook and resources occupied by the URLLC Physical Uplink Shared channel (PUSCH) dynamically scheduled by the URLLC uplink grant (UL grant). In FIG. 3, there is a time domain conflict between the PUCCH resources occupied by the eMBB HARQ-ACK codebook and the resources occupied by the HARQ-ACK codebook of the URLLC PDSCH dynamically scheduled by the URLLC downlink grant (DL grant). In FIG. 4, there is a time domain conflict between the PUCCH resources occupied by the eMBB HARQ-ACK codebook and the resources occupied by a semi-static configured URLLC PUSCH. In FIG. 5, there is a time domain conflict between the PUCCH resources occupied by the eMBB HARQ-ACK codebook and the resources occupied by a semi-static configured URLLC scheduling request (SR).

At this time, in order to protect the transmission of URLLC and ensure the high reliability and low latency of the URLLC service, the HARQ-ACK of the eMBB will be punctured or discarded. For the HARQ-ACK that is punctured or discarded, the PDSCH is subsequently retransmitted to ensure reliability. However, the HARQ-ACK information of eMBB will be transmitted in the form of HARQ-ACK codebook. The HARQ-ACK codebook is formed by concatenating the HARQ-ACK information bits of one or more PDSCHs. n actual transmission, a HARQ-ACK codebook is likely to be HARQ-ACK information bits of multiple PDSCHs combined into one HARQ-ACK codebook to be transmitted. If the HARQ-ACK codebook is punctured or discarded, a large number of PDSCH retransmissions will be caused. Therefore, a solution is needed to transmit the eMBB HARQ-ACK information to avoid unnecessary retransmission of the eMBB PDSCH when the eMBB HARQ-ACK codebook is punctured or discarded.

In view of this, the present disclosure provides a HARQ-ACK transmission method, when there is a time domain resource conflict between a transmission of a certain service type of HARQ-ACK and a transmission of other service types of information data, the HARQ-ACK codebook is punctured or discarded. In this case, the HARQ-ACK is retransmitted to reduce the retransmission of a large number of PDSCHs.

In the present disclosure, for the convenience of description, a service type that needs to transmit HAQR-ACK is referred to as a first service type, and a service type for transmitting information data is referred to as a second service type. For example, the first service type is the eMBB service type, and the second service type is the URLLC service type.

Figure 6:
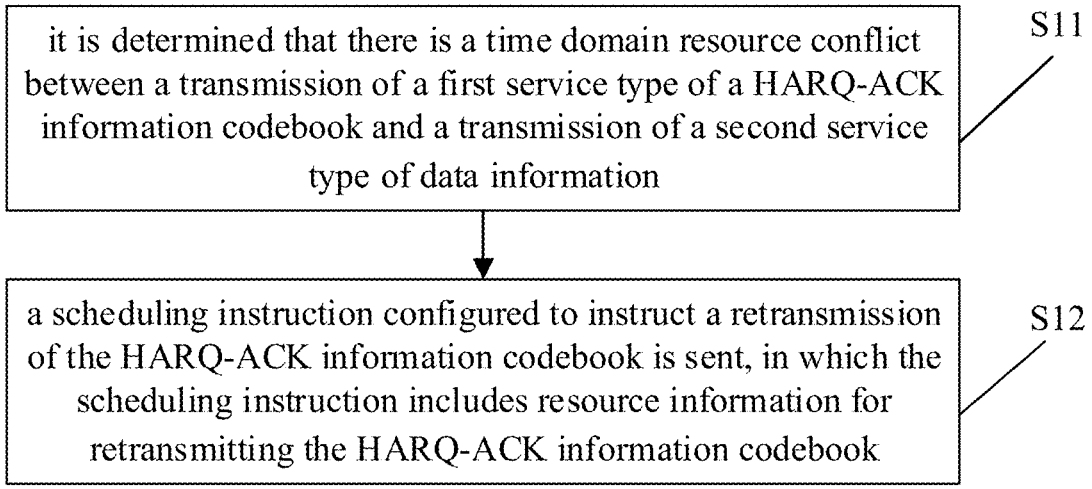
FIG. 6 is a flowchart of a method for transmitting HARQ-ACK information according to one or m examples of the present disclosure.

FIG. 6 is a flowchart showing a method for transmitting HARQ-ACK information according to an example. As shown in FIG. 6, the method for transmitting HARQ-ACK information is used in a network device, and includes the following steps.

In step S11, it is determined that there is a time domain resource conflict between a transmission of a first service type of HARQ-ACK information codebook and a transmission of a second service type of data information.

In the present disclosure, the first service type and the second service type are service types concurrently supported by the terminal, for example, the first service type is the eMBB service type, and the second service type is the URLLC service type. The first service type of the HARQ-ACK information codebook may be understood as uplink HARQ-ACK information corresponding to the first service type of the PDSCH.

The second service type of the data information can be understood as the second service type of data information or control information. For example, the data information can be the second service type of the PUSCH information, or the second service type of the HARQ-ACK information, or the second service type of the SR information.

In the present disclosure, determining that there is the time domain resource conflict between the transmission of the first service type of the HARQ-ACK information codebook and the transmission of the second service type of the data information may include following two situations: in one case, the time domain resource conflict between the transmission of the first service type of the HARQ-ACK information codebook and the transmission of the second service type of the data information will occur. In another case, the time domain resource conflict between the transmission of the first service type of the HARQ-ACK information codebook and the transmission of the second service type of the data information has already occurred.

When the second service type of the data information is scheduled by the dynamic scheduling instruction, the dynamic scheduling instruction includes the transmission resource information of the second service type of the data information, and then the network device can pre-determine that the time domain resource conflict between the transmission of the first service type of the HARQ-ACK information codebook and the transmission of the second service type of the data information will occur according to such scheduling instruction. When the second service type of the data information is scheduled by a semi-static scheduling instruction, the network device needs to determine that there is the time domain resource conflict between the transmission of the first service type of the HARQ-ACK information codebook and the transmission of the second service type of the data information in response to receiving or scheduling the second service type of the data information.

In step S12, a scheduling instruction configured to instruct a retransmission of the HARQ-ACK information codebook is sent, in which the scheduling instruction includes resource information for retransmitting the HARQ-ACK information codebook.

In the present disclosure, when it is determined that there is a time domain resource conflict between the transmission of the first service type of the HARQ-ACK information codebook and the transmission of the second service type of the data information, the network device sends the scheduling instruction configured to instruct the retransmission of the HARQ-ACK information codebook to the terminal, so as to avoid a large number of unnecessary PDSCH retransmissions when the first service type of the HARQ-ACK information codebook is punctured or discarded.

In an example of the present disclosure, the scheduling instruction configured to instruct a retransmission of the HARQ-ACK information codebook is a control signaling scrambled through a radio network temporary indicator (RNTI) dedicated to identify a retransmission of the HARQ-ACK information codebook.

In the present disclosure, a pre-defined method can be used to define the RNTI dedicated to identify the retransmission of the HARQ-ACK information codebook in the protocol, or a high-level signaling notification method can be used to send the RNTI dedicated to identify the retransmission of the HARQ-ACK information codebook to the terminal in advance. The network device sends the downlink control signaling which is scrambled through a radio network temporary indicator (RNTI) dedicated to identify a retransmission of the HARQ-ACK information codebook, so that the terminal receiving the scheduling instruction can recognize that the scheduling instruction is the scheduling instruction is configured to indicate the retransmission of the HARQ-ACK information codebook.

In an example, the scheduling instruction used to indicate the retransmission of the HARQ-ACK information codebook may be a downlink control signaling (downlink control information, DCI), where the DCI indicates resource information of the retransmission of the HARQ-ACK information codebook. By scrambling through the RNTI dedicated to identify a retransmission of the HARQ-ACK information codebook, the DCI makes the terminal to identify that the DCI is the DCI configured to indicate the retransmission of resource information of the HARQ-ACK information codebook.

Further, the DCI used to indicate the retransmission of the HARQ-ACK information codebook may be a dynamic scheduling instruction, such as a UL grant or a DL grant. On the one hand, when the DCI used to indicate the retransmission of the HARQ-ACK information codebook is a UL grant, the UL grant is used to schedule PUSCH resources, and the retransmitted HARQ-ACK information codebook can be carried on the PUSCH resource scheduled by the UL grant. On the other hand, when the DCI used to indicate the retransmission of the HARQ-ACK information codebook is a DL grant, the DL grant is used to schedule PDSCH resources and indicates the PUCCH resources for transmitting the PDSCH HARQ-ACK information, and the retransmitted HARQ-ACK information codebook may be carried on the PUCCH resource indicated by the DL grant.

In the present disclosure, for the convenience of description, the dynamic scheduling instruction configured to instruct the retransmission of the HARQ-ACK information codebook may be referred to as a first dynamic scheduling instruction. The dynamic scheduling instruction for scheduling the second service type of the data information is referred to as a second dynamic scheduling instruction.

In the present disclosure, the network device sends the scheduling instruction configured to instruct the retransmission of the HARQ-ACK information codebook according to the specific situation of the time domain resource conflict between the transmission of the first service type of the HARQ-ACK information codebook and the transmission of the second service type of the data information. In one case, the network device pre-determines that the time domain resource conflict between the transmission of the first service type of the HARQ-ACK information codebook and the transmission of the second service type of the data information will occur according to the second dynamic scheduling instruction, the network device sends the scheduling instruction configured to instruct the retransmission of the HARQ-ACK information codebook at a detection timing of a physical downlink control channel same as the second dynamic scheduling instruction; or sends the scheduling instruction configured to instruct the retransmission of the HARQ-ACK information codebook after sending the second dynamic scheduling instruction. In another case, the network device needs to send the scheduling instruction configured to instruct the retransmission of the HARQ-ACK information codebook after the time domain resource conflict between the transmission of the first service type of the HARQ-ACK information codebook and the transmission of the second service type of the data information has already occurred. In this case, the network device needs to determine a time point for sending the scheduling instruction configured to instruct retransmission of the HARQ-ACK information codebook according to the time required to receive and demodulate the second service type of the data information. Usually, it is the time point when the scheduling instruction configured to instruct the retransmission of the HARQ-ACK information codebook is sent after the time required for receiving and demodulating the second service type of the data information. In the present disclosure, the network device presets the duration, and the preset duration is greater than or equal to the duration for demodulating the second service type of the data information. For the convenience of description, the preset duration is referred to as a first duration. After the preset first duration, the network device sends a scheduling instruction configured to instruct the retransmission the HARQ-ACK information codebook.

In the present disclosure, the first duration may be pre-defined, or may be pre-configured through high-layer signaling. The first duration is related to factors such as the subcarrier bandwidth used for transmission. For example, the first duration is pre-defined or pre-configured to be 6 symbols. The first duration of data information for different second service types may be the same or different. For example, the first duration value may be the same or different in a situation where the URLLC SR collides with the eMBB HARQ-ACK codebook and a situation where the URLLC PUSCH collides with the eMBB HARQ-ACK codebook. Considering that the time for the network device to demodulate the SR signal is generally shorter than the time to demodulate the PUSCH, the first duration value in the situation where the URLLC SR collides with eMBB HARQ-ACK codebook can be configured to be longer than first duration value in the situation where the URLLC PUSCH collides with eMBB HARQ-ACK codebook.

Furthermore, in the example of the present disclosure, the network device may also send duration information representing the maximum duration for sending the scheduling instruction to the terminal, so as to reduce the overhead of the terminal blindly detecting the codebook scheduling instruction configured to indicate the retransmission of the HARQ-ACK information. The maximum duration information representing sending the scheduling instruction can be understood as the duration of a valid time interval of the terminal to perform a blind detection on the scheduling instruction. Only within this valid time interval, the terminal will try to perform blind detection on the scheduling instruction configured to indicate the retransmission of the HARQ-ACK information codebook. The terminal will not attempt to perform blind detection on the scheduling instruction used to indicate the retransmission of the HARQ-ACK information codebook beyond the valid time interval. The duration may be a specific duration value, such as 3 ms.

Figure 7:
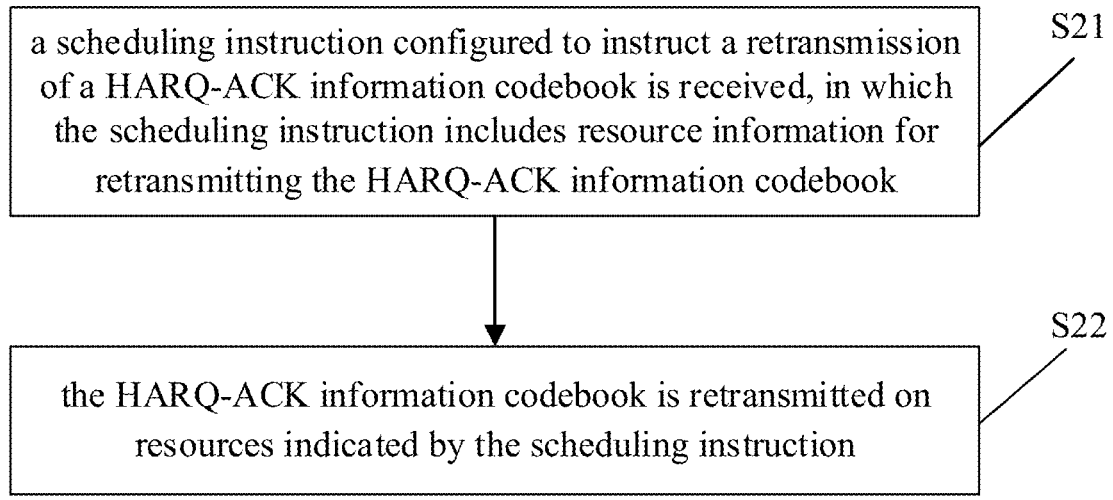
FIG. 7 is a flowchart showing a method for transmitting HARQ-ACK information according to one or m examples of the present disclosure.

FIG. 7 is a flowchart showing a method for transmitting HARQ-ACK information according to an example. As shown in FIG. 7, the method for transmitting HARQ-ACK information is used in a terminal, and includes the following steps.

In step S21, a scheduling instruction configured to instruct a retransmission of a HARQ-ACK information codebook is received, in which the scheduling instruction includes resource information for retransmitting the HARQ-ACK information codebook.

In step S22, the HARQ-ACK information codebook is retransmitted on resources indicated by the scheduling instruction.

In an implementation, the scheduling instruction configured to instruct the retransmission of the HARQ-ACK information codebook in the present disclosure is a scheduling instruction scrambled through RNTI dedicated to identify the retransmission of the HARQ-ACK information codebook. The RNTI dedicated to identify the retransmission of the HARQ-ACK information codebook is pre-defined or pre-configured through high-layer signaling.

The scheduling instruction used to indicate the retransmission of the HARQ-ACK information codebook in the present disclosure may be downlink control signaling, and the downlink control signaling is scrambled by the RNTI dedicated to identify the retransmission of the HARQ-ACK information codebook.

Further, the DCI scrambled by the RNTI dedicated to identify the retransmission of the HARQ-ACK information codebook may be a first dynamic scheduling instruction, for example, may be a UL grant or a DL grant. The resources of the retransmission of the HARQ-ACK information codebook indicated by the first dynamic scheduling instruction may be PUSCH resources or PUCCH resources. When the terminal retransmits the HARQ-ACK information codebook, the terminal retransmits the HARQ-ACK information codebook on the PUSCH resource or PUCCH resource scheduled by the first dynamic scheduling instruction.

Further, on the one hand, if the second service type of the data information is scheduled by the second dynamic scheduling instruction, the terminal receives the scheduling instruction configured to instruct the retransmission of the HARQ-ACK information codebook at a detection timing of a physical downlink control channel same as the second dynamic scheduling instruction; or receives the scheduling instruction configured to instruct the retransmission of the HARQ-ACK information codebook after receiving the second dynamic scheduling instruction. On the other hand, if the second service type of the data information is scheduled by a semi-static scheduling instruction, the terminal receives the scheduling instruction configured to instruct the retransmission of the HARQ-ACK information codebook after a preset first duration, in which the first duration is greater than or equal to a duration for demodulating the second service type of the data information.

In the present disclosure, the terminal may further receive duration information sent by the network device in advance, where the duration information represents the maximum duration information for sending the scheduling instruction. When the terminal receives the scheduling instruction used to instruct the retransmission of the HARQ-ACK information codebook, receiving the scheduling instruction configured to instruct the retransmission of the HARQ-ACK information codebook within the maximum duration represented by the received duration information to reduce times of blind detections. Further, if the terminal does not receive the scheduling instruction configured to instruct the retransmission of the HARQ-ACK information codebook within the maximum time period, the terminal cancels the retransmission of the HARQ-ACK information codebook.

Figure 8A:
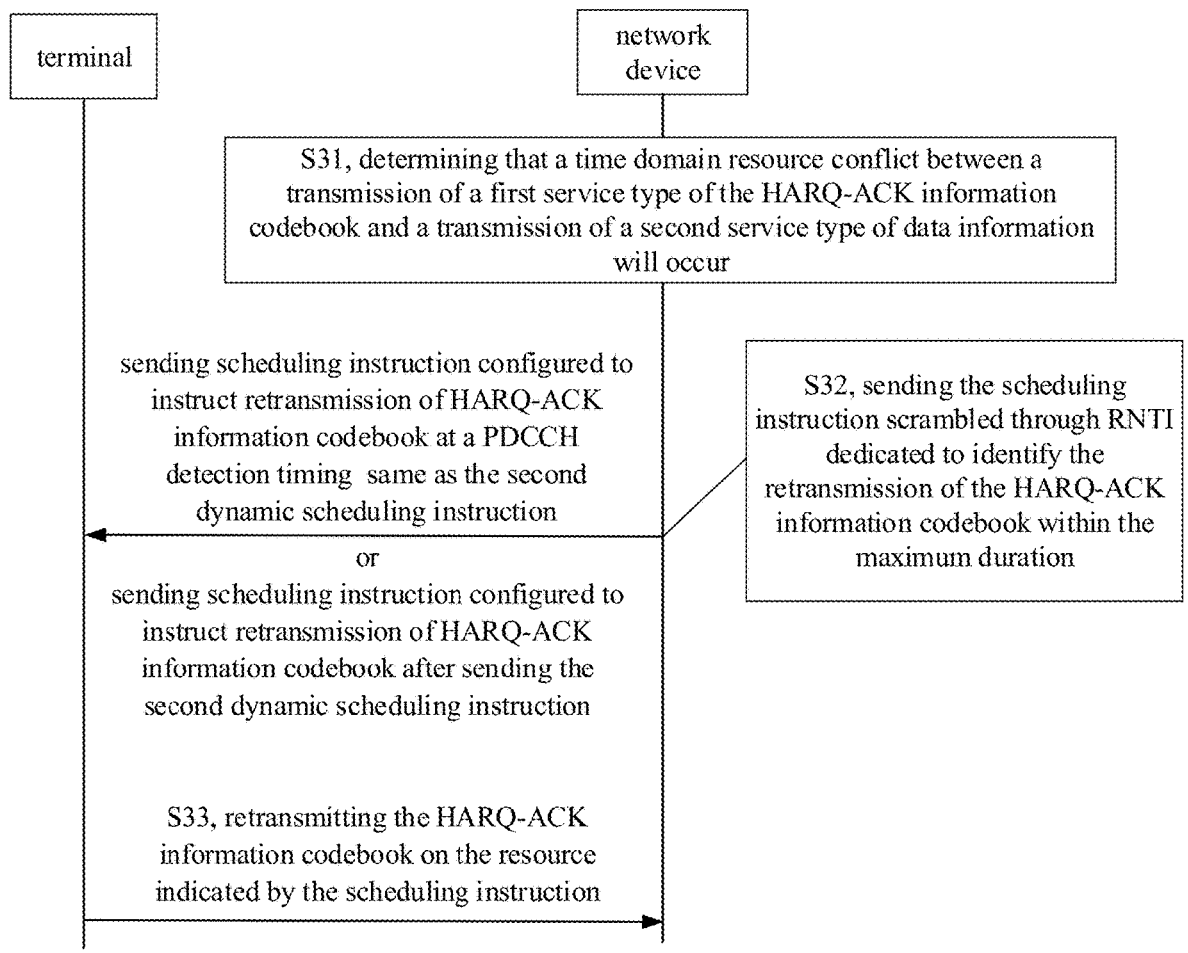
FIGS. 8A and 8B are flowcharts illustrating a method for transmitting HARQ-ACK information according to one or m examples of the present disclosure.
Figure 8B:
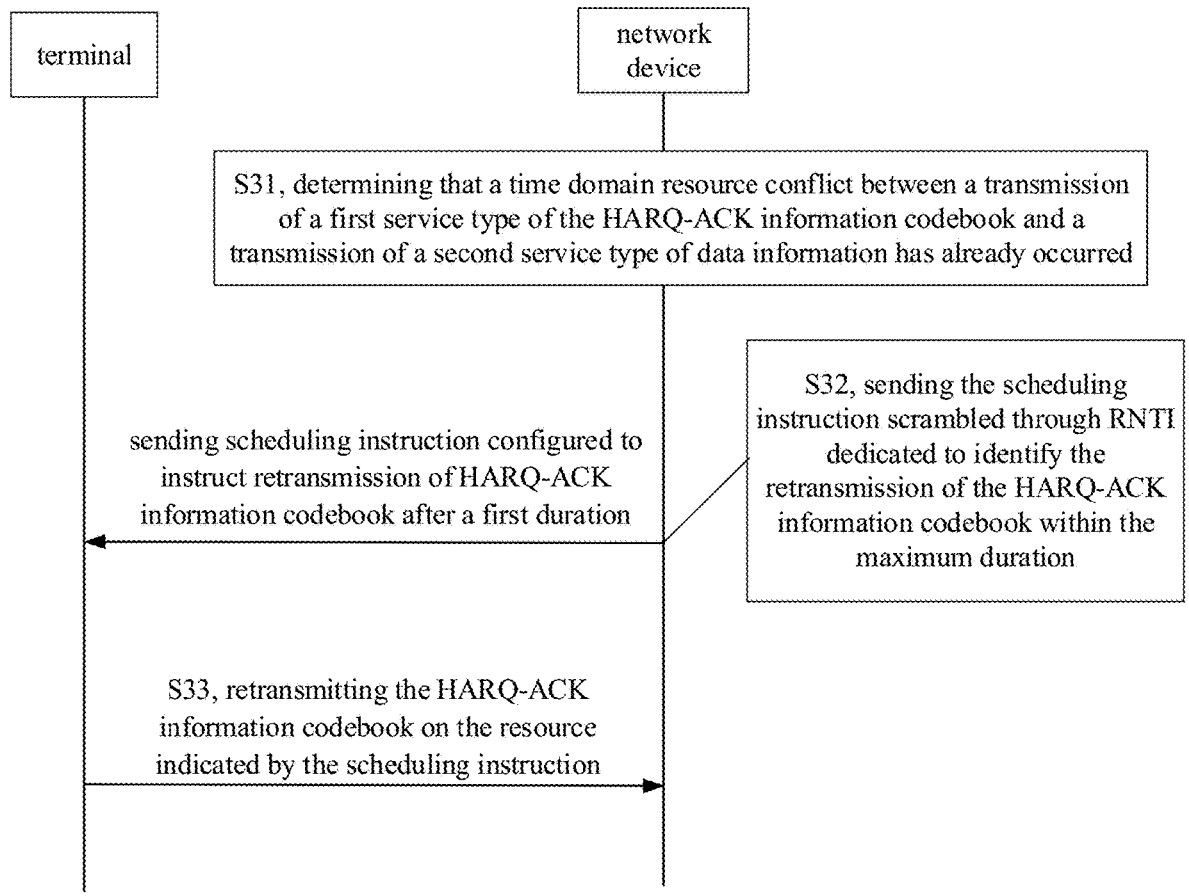

FIGS. 8A and 8B are flowcharts of a method for transmitting HARQ-ACK information according to an example of the present disclosure. As shown in FIGS. 8A and 8B, the method for transmitting HARQ-ACK information is used in the interaction process between a terminal and a network device, which includes the following steps.

In step S31, the network device determines that there is a time domain resource conflict between a transmission of a first service type of the HARQ-ACK information codebook and a transmission of a second service type of data information.

Determining that the time domain resource conflict between a transmission of the first service type of the HARQ-ACK information codebook and the transmission of the second service type of the data information, may be determining that the time domain resource conflict between the transmission of the first service type of the HARQ-ACK information codebook and the transmission of the second service type of the data information will occur in advance on the one hand, as shown in FIG. 8A, and may be determining that the time domain resource conflict between the transmission of the first service type of the HARQ-ACK information codebook and the transmission of the second service type of the data information has already occurred on the other hand, as shown in FIG. 8B.

In step S32, the network device sends a scheduling instruction configured to instruct the retransmission of the HARQ-ACK information codebook, where the scheduling instruction includes resource information for retransmitting the HARQ-ACK information codebook. The terminal receives the scheduling instruction sent by the network device and configured to instruct the retransmission of the HARQ-ACK information codebook.

The scheduling instruction is scrambled by the RNTI dedicated to identify the retransmission of the HARQ-ACK information codebook. The resources used for the retransmission of the HARQ-ACK information codebook may be PUSCH resources or PUCCH resources scheduled by the dynamic scheduling instruction.

In an implementation, the network device pre-determines that there is the time domain resource conflict between the transmission of the first service type of the HARQ-ACK information codebook and the second service type of the data information, the network device sends the scheduling instruction configured to instruct the retransmission of the HARQ-ACK information codebook at a detection timing of a physical downlink control channel same as the second dynamic scheduling instruction, or sends the scheduling instruction configured to instruct the retransmission of the HARQ-ACK information codebook after sending the second dynamic scheduling instruction. The terminal receives the scheduling instruction configured to instruct the retransmission of the HARQ-ACK information codebook at a detection timing of a physical downlink control channel same as the second dynamic scheduling instruction; or receives the scheduling instruction configured to instruct the retransmission of the HARQ-ACK information codebook after receiving the second dynamic scheduling instruction.

In another implementation, when the network device determines that there is the time domain resource conflict between the transmission of the first service type of the HARQ-ACK information codebook and the second service type of the data information, the network device sends the scheduling instruction configured to instruct the retransmission of the HARQ-ACK information codebook after a first duration. The terminal receives the scheduling instruction configured to instruct the retransmission of the HARQ-ACK information codebook after the first duration.

Further, in the present disclosure, the network device sends duration information to the terminal. The terminal receives the duration information sent by the network device, and receives, within the maximum duration represented by the duration information, the scheduling instruction configured to indicate the retransmission of the HARQ-ACK information codebook.

In the present disclosure, if the terminal receives the scheduling instruction configured to instruct the retransmission of the HARQ-ACK information codebook within the maximum duration, step S33 is executed to retransmit the HARQ-ACK information codebook. If the terminal does not receive the scheduling instruction configured to instruct the retransmission of the HARQ-ACK information codebook within the maximum duration, the retransmission of the HARQ-ACK information codebook is cancelled.

In step S33, the terminal retransmits the HARQ-ACK information codebook on the resource indicated by the scheduling instruction.

In an example, the terminal retransmits the HARQ-ACK information codebook on the PUSCH resource or PUCCH resource scheduled by the first dynamic instruction.

It can be understood that, for the places where the description of the retransmission of HARQ-ACK information codebook in the interaction process between the network device and the terminal is not detailed enough, please refer to the above-mentioned related description of the method for retransmitting the HARQ-ACK information codebook of the network device and terminal, which will not be described in detail here.

The present disclosure will exemplify the HARQ-ACK information transmission method involved in the above examples in combination with practical applications, by taking first service type as the eMBB service type and the second service type as the URLLC service type as an example for description.

When the network device predicts that a transmission conflict will occur in the eMBB HARQ-ACK information codebook of a certain terminal, or after the network device learns that the HARQ-ACK information codebook of eMBB has already had a transmission conflict, the network device sends a message to the terminal a scheduling instruction for scheduling the terminal to retransmit the HARQ-ACK information codebook, such as DCI, which indicates the resources used for retransmitting the eMBB HARQ-ACK information codebook. The DCI is scrambled with the RNTI dedicated to identify the retransmission of HARQ-ACK information codebook, so that the terminal can recognize that the DCI is the DCI used to indicate the resource for retransmitting the eMBB HARQ-ACK information codebook.

The transmission resources of URLLC can be scheduled through dynamic scheduling instructions, or can be configured through semi-static configuration. In the following, the present disclosure will respectively describe the situation where time domain resource conflict occurs between the transmission of the eMBB HARQ-ACK information codebook and the dynamically scheduled URLLC, and the situation where the time domain resource conflict occurs between the eMBB HARQ-ACK information codebook and the transmission of the semi-persistent configured URLLC.

Situation 1, in which the time domain resource conflict occurs between the eMBB HARQ-ACK information codebook and the transmission of the dynamically scheduled URLLC, is described below.

FIG. 2 and FIG. 3 are schematic diagrams illustrating a time-domain resource conflict between the eMBB HARQ-ACK information codebook and the transmission of the dynamically scheduled URLLC. It can be seen from FIG. 2 and FIG. 3 that the URLLC PUSCH or URLLC HARQ-ACK information is scheduled by the dynamic scheduling instruction sent by the network device. The dynamic scheduling instruction sent by the network device to schedule the URLLC PUSCH or the URLLC HARQ-ACK information may be DCI. There are many kinds of DCI, such as UL grant and DL grant. For example, the network device uses the UL grant to schedule the terminal to transmit the PUSCH, and the UL grant indicates information such as time-frequency resources of the PUSCH. For another example, the network device uses the DL grant to schedule PDSCH transmission and PDSCH HARQ-ACK information transmission. The DL grant indicates information such as time-frequency resources used when the terminal transmits the PDSCH HARQ-ACK information. When the network device issues the dynamic scheduling instruction for scheduling URLLC PUSCH or URLLC HARQ-ACK information, the network device can pre-determine that the time domain conflict will occur between the eMBB HARQ-ACK information codebook with the URLLC PUSCH or PDSCH HARQ-ACK information according to the time-frequency resource information scheduled by the dynamic scheduling instruction. Therefore, while or after the network device sends the dynamic scheduling instruction for scheduling the URLLC PUSCH or URLLC HARQ-ACK information, the network device can send to the terminal the scheduling instruction for scheduling the terminal to retransmit the HARQ-ACK information codebook, such as DCI, the DCI indicates the resource used for retransmitting the eMBB HARQ-ACK information codebook. The DCI is scrambled with the RNTI dedicated to identify the codebook of retransmission HARQ-ACK information, so that the terminal can recognize that the DCI is the DCI used to indicate the resource for retransmitting the eMBB HARQ-ACK information codebook. When the network device sends out the dynamic scheduling instruction for scheduling the URLLC PUSCH or the URLLC HARQ-ACK information, it can be understood that it is at the same PDCCH detection timing as the dynamic scheduling instruction for scheduling the URLLC PUSCH or the URLLC HARQ-ACK information. The PDCCH detection timing can be understood as a time-frequency resource used to carry the PDCCH channel, and the time-frequency resource may carry one or more pieces of DCI information.

Figure 9:
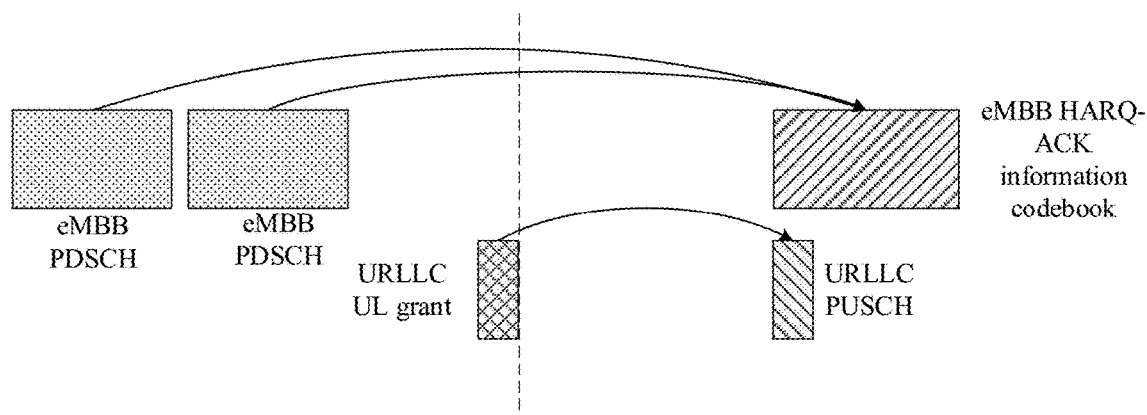
FIG. 9 is a schematic diagram illustrating a transmission timing of HARQ-ACK information according to one or m examples of the present disclosure.

In the present disclosure, the time point at which the network device sends the scheduling instruction for scheduling the terminal to retransmit the eMBB HARQ-ACK information codebook may be as shown in FIG. 9. In FIG. 9, the network device may send DCI to instruct a new transmission resource of eMBB HARQ-ACK information by sending DCI at the same time as sending the UL grant, or after this time point.

Further, in the present disclosure, the network device may pre-send duration information representing the maximum duration for the network device sending the scheduling instruction to the terminal, for example, the duration information indicates that the maximum duration for sending the scheduling instruction is T1. In other words, the network device may send the DCI scheduling eMBB HARQ-ACK information within the duration T1 after sending the UL grant of the URLLC. Within the duration T1 after receiving the UL grant of the URLLC, if the terminal has not received the DCI for scheduling the eMBB HARQ-ACK information sent by the network device, the terminal will give up retransmitting the eMBB HARQ-ACK information. The length of the duration T1 may be configured by the network device through high-layer signaling, such as Radio Resource Control (RRC) signaling.

In the present disclosure, presupposing that the terminal detects the maximum duration information of the DCI for scheduling eMBB HARQ-ACK information sent by the network device is mainly for the purpose of reducing the complexity of the terminal's DCI blind detection. If it is agreed that the DCI of the scheduled eMBB HARQ-ACK information can only be sent in a specific time period, the terminal only needs to perform blind detection of the DCI in the specific time period, and does not need to perform the blind detection of the DCI in other time periods. Therefore, the complexity of blind DCI detection by the terminal can be reduced.

Figure 10:
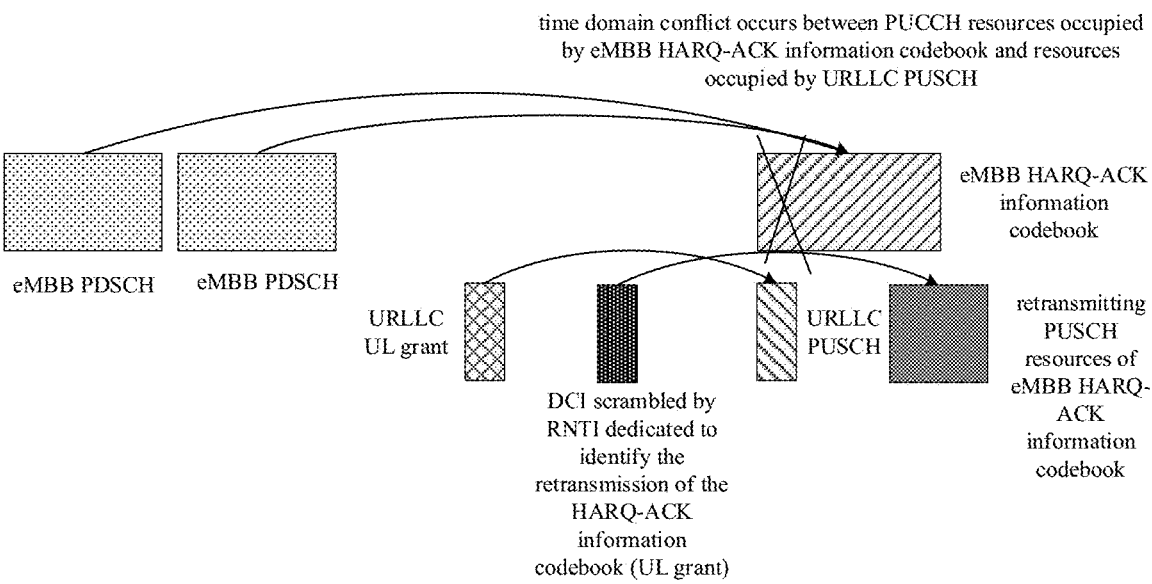
FIG. 10 is a schematic diagram showing a transmission resource of HARQ-ACK information according to one or m examples of the present disclosure.

Further, on one hand, the DCI scheduling the eMBB HARQ-ACK information transmission in the present disclosure may be a UL grant scrambled by an RNTI dedicated to identify a retransmission of the HARQ-ACK information codebook. The UL grant scrambled by the RNTI dedicated to identify the retransmission of the HARQ-ACK information codebook is used to schedule a PUSCH resource, and the terminal carries the eMBB HARQ-ACK information codebook that needs to be retransmitted on the PUSCH resource for transmission, as shown in FIG. 10.

Figure 11:
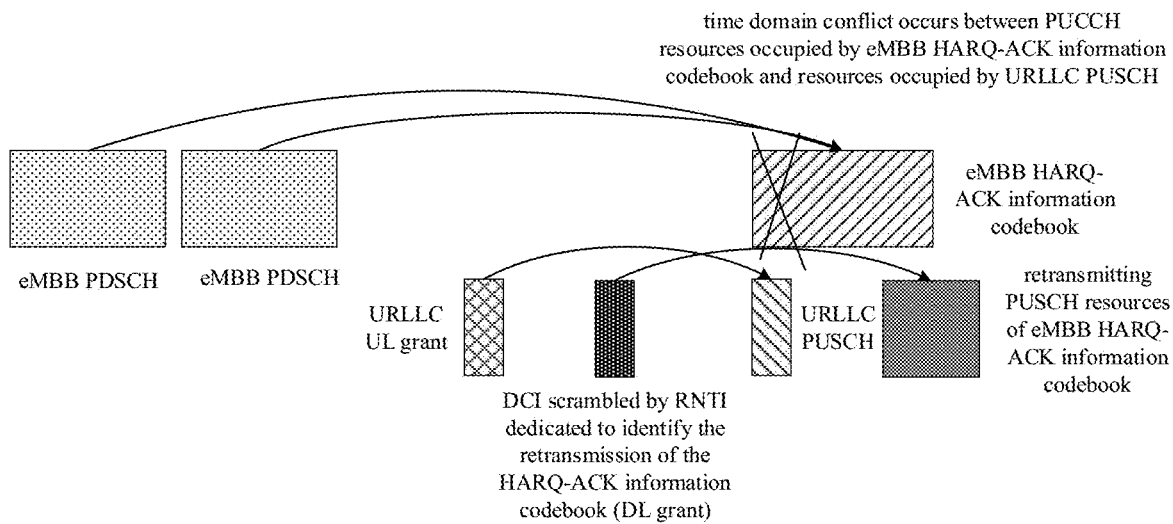
FIG. 11 is a schematic diagram showing a transmission resource of HARQ-ACK information according to one or m examples of the present disclosure.

On the other hand, the DCI scheduling eMBB HARQ-ACK information transmission in the present disclosure may be a DL grant scrambled by an RNTI dedicated to identify the retransmission of the HARQ-ACK information codebook. The DL grant scrambled by the RNTI dedicated to identify the retransmission of the HARQ-ACK information codebook is used to schedule a new eMBB PDSCH, and indicates the corresponding PUCCH resource for transmitting the PDSCH HARQ-ACK information. The terminal places the eMBB HARQ-ACK information codebook that needs to be retransmitted together with the HARQ-ACK information corresponding to the new eMBB PDSCH on the PUCCH resource indicated in the DL grant for transmission, as shown in FIG. 11.

Situation 2, in which the time-domain resource conflict occurs between the eMBB HARQ-ACK codebook and the semi-static configured URLLC transmission, is described below.

FIG. 4 and FIG. 5 are schematic diagrams illustrating a time-domain resource conflict between an eMBB HARQ-ACK information codebook and a semi-static configured URLLC transmission. The semi-static configured URLLC transmission resources include semi-static configured PUSCH time-frequency resources or semi-static configured SR time-frequency resources. The semi-static configured PUSCH time-frequency resources or the semi-static configured SR time-frequency resources appear periodically, but not every periodically appearing PUSCH time-frequency resource or SR time-frequency resource has corresponding signal transmission. The terminal autonomously determines whether there is actual signal transmission at the time-frequency resource location configured in a certain period. The network device needs to receive and demodulate the URLLC PUSCH or SR time-frequency resource information before judging that there is a time domain resource conflict between the eMBB HARQ-ACK information codebook and the semi-static configured URLLC transmission. If the network device does not receive and demodulate the URLLC PUSCH or SR time-frequency resource information at the corresponding location, then the network device may determine that there is no time-frequency resource conflict between the eMBB HARQ-ACK information codebook and the semi-static configured URLLC transmission.

After the network device determines that there is a time-frequency resources conflict between the eMBB HARQ-ACK information codebook and the semi-static configured URLLC transmission, it can send a scheduling instruction to the terminal for scheduling the terminal to retransmit the eMBB HARQ-ACK information codebook, such as DCI. The resource used for retransmitting the eMBB HARQ-ACK information codebook is indicated in the DCI. The DCI is scrambled with the RNTI dedicated to identify the retransmission of the HARQ-ACK information codebook, so that the terminal can recognize that the DCI is the DCI used to indicate the resource for retransmitting the eMBB HARQ-ACK information codebook.

Figure 12:
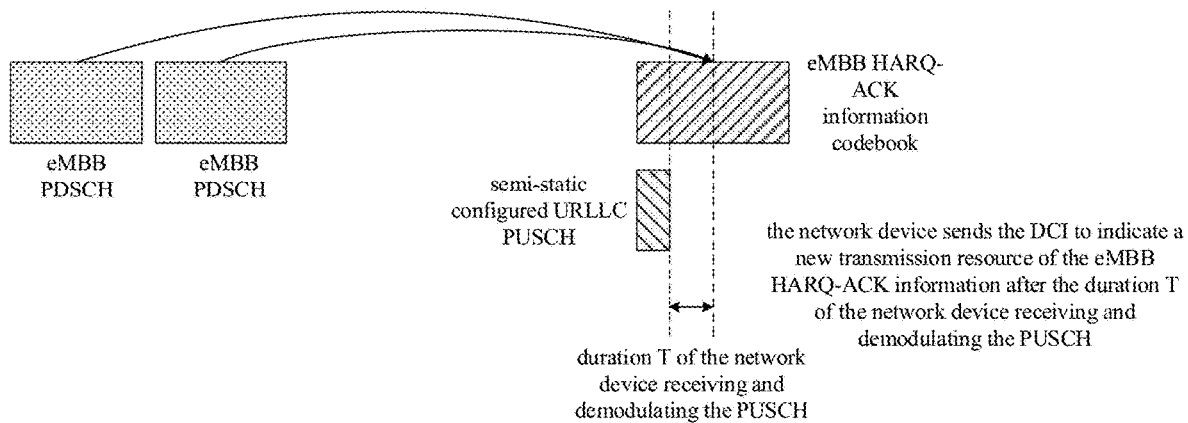
FIG. 12 is a schematic diagram illustrating a transmission timing of HARQ-ACK information according to one or m examples of the present disclosure.

The time point when the network device sends the scheduling instruction for scheduling the terminal to retransmit the eMBB HARQ-ACK information codebook described in the present disclosure is shown in FIG. 12. In FIG. 12, the network device sends the DCI to indicate a new transmission resource of the eMBB HARQ-ACK information after the duration T of the network device receiving and demodulating the PUSCH. In FIG. 12, the duration T of receiving and demodulating the PUSCH is a duration from when the terminal transmits an end symbol of the PUSCH until the network device knows that the conflict occurs (because the network device needs a period of time to detect whether the conflict has occurred, it is necessary to have this time interval T). The T value may be agreed in a protocol or configured for the terminal by high-layer signaling of the network device. The T value may be related to factors such as the subcarrier bandwidth used for transmission. For example, the T value is agreed or configured as 6 symbols. The T value may be the same or different for the situation where the conflict occurs between the URLLC SR and the eMBB HARQ-ACK information codebook and the situation where the conflict occurs between the URLLC PUSCH and the eMBB HARQ-ACK information codebook. Considering that the time for the network device to demodulate the SR signal is generally shorter than the time to demodulate the PUSCH, the T value in the situation where the conflict occurs between the URLLC SR and the eMBB HARQ-ACK information codebook can be configured to be smaller than the T value in the situation where the conflict occurs between the URLLC PUSCH and eMBB HARQ-ACK information codebooks.

Further, in the present disclosure, the network device may pre-send the duration information representing the maximum duration for the network device to send the scheduling instruction to the terminal, for example, the duration information indicates that the maximum duration for sending the scheduling instruction is T2. In other words, the network device may send the DCI for scheduling the eMBB HARQ-ACK information within the duration T2 after the above-mentioned duration T. The terminal receives the DCI of the scheduling eMBB HARQ-ACK information sent by the network device within the time T2 after the duration T ends. If the terminal has not received the DCI for scheduling the eMBB HARQ-ACK information sent by the network device within the duration T2 after the end of the duration T, the terminal will give up retransmitting the eMBB HARQ-ACK information. The length of the duration T2 may be configured by the network device through higher layer signaling, such as RRC signaling. The value of T2 here may be the same as or different from the value of T1 described above.

Figure 13:
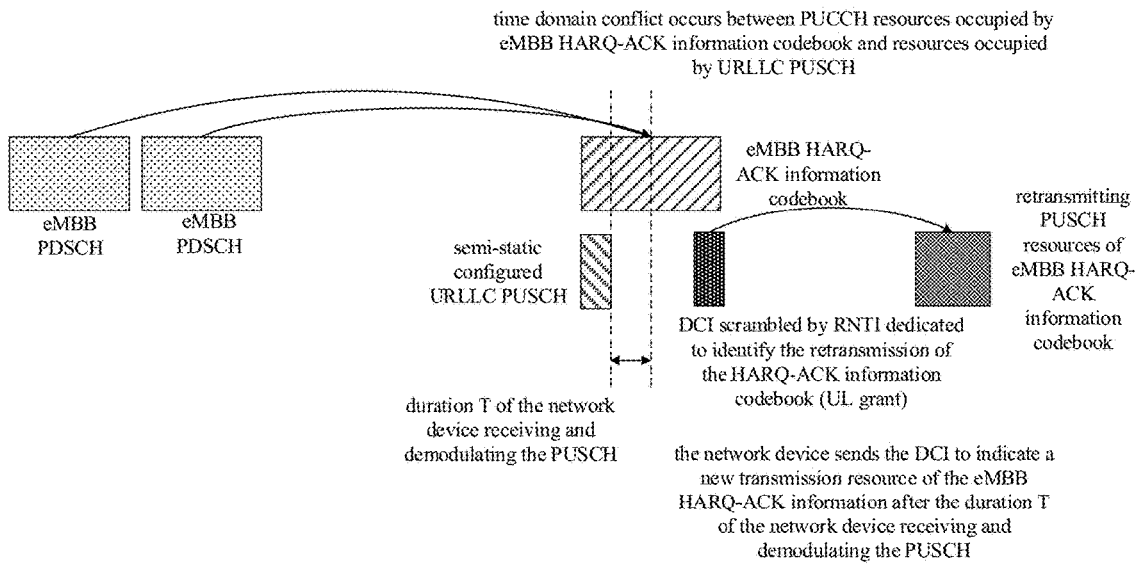
FIG. 13 is a schematic diagram showing a transmission resource of HARQ-ACK information according to one or m examples of the present disclosure.

In one aspect, the DCI scheduling the transmission of eMBB HARQ-ACK information in the present disclosure may be a UL grant scrambled by an RNTI dedicated to identify the retransmission of the HARQ-ACK information codebook. The UL grant scrambled by RNTI dedicated to identify the retransmission of the HARQ-ACK information codebook is used to schedule a PUSCH resource, and the terminal carries the eMBB HARQ-ACK information codebook that needs to be retransmitted on the PUSCH resource for transmission, as shown in FIG. 13.

Figure 14:
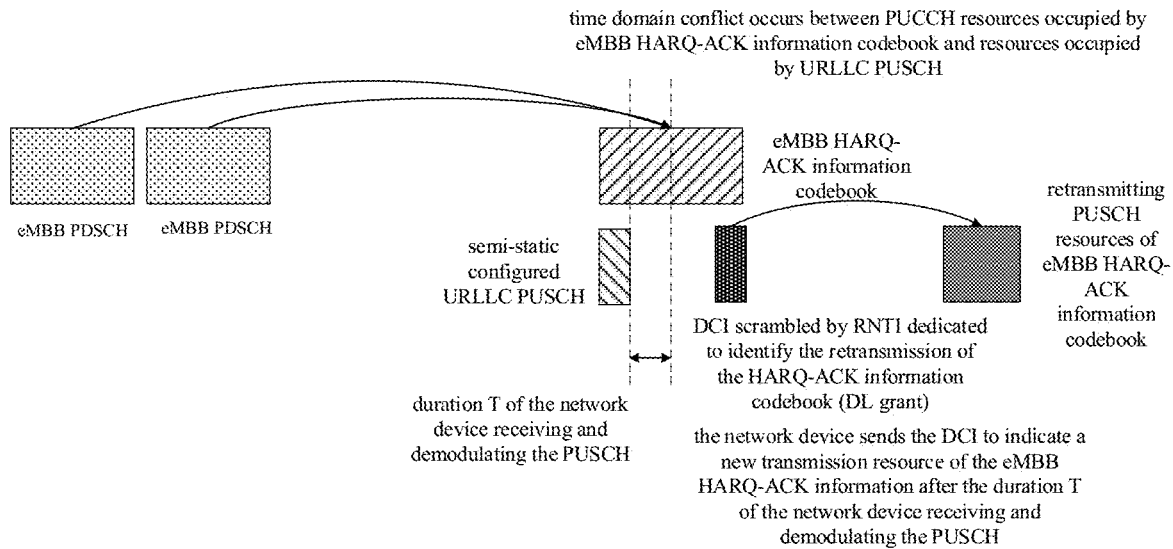
FIG. 14 is a schematic diagram showing a transmission resource of HARQ-ACK information according to one or m examples of the present disclosure.

On the other hand, the DCI scheduling eMBB HARQ-ACK information transmission in the present disclosure may be a DL grant scrambled by RNTI dedicated to identify the retransmission of the HARQ-ACK information codebook. The DL grant scrambled by the RNTI dedicated to identify the retransmission of the HARQ-ACK information codebook is used to schedule a new eMBB PDSCH, and indicates the corresponding PUCCH resource for transmitting the PDSCH HARQ-ACK information. The terminal transmits the eMBB HARQ-ACK information codebook that needs to be retransmitted together with the HARQ-ACK information corresponding to the new eMBB PDSCH on the PUCCH resource indicated in the DL grant, as shown in FIG. 14.

With the method for transmitting the HARQ-ACK information provided above in the present disclosure, the retransmission of the HARQ-ACK information may be scheduled through the scheduling instruction dedicated to identify the RNTI scrambled codebook dedicated to identify the retransmission of the HARQ-ACK information codebook, such that the terminal may be enabled to identify the scheduling instruction and transmit the HARQ-ACK information on the time-frequency resource corresponding to the scheduling instruction to ensure reliability and avoid unnecessary PDSCH retransmission after the HARQ-ACK information is punctured or discarded.

Based on the same concept, examples of the present disclosure also provides an apparatus for transmitting HARQ-ACK information.

It can be understood that, in order to implement the above-mentioned functions, the apparatus for transmitting HARQ-ACK information provided by the examples of the present disclosure includes corresponding hardware structures and/or software modules for executing each function. Combining with the units and algorithm steps of each example disclosed in the examples of the present disclosure, the examples of the present disclosure can be implemented in hardware or a combination of hardware and computer software. Whether a function is performed by hardware or computer software driven hardware depends on the specific application and design constraints of the technical solution. Those skilled in the art may use different methods to implement the described functions for each specific application, but such implementation should not be considered beyond the scope of the technical solutions of the examples of the present disclosure.

Figure 15:
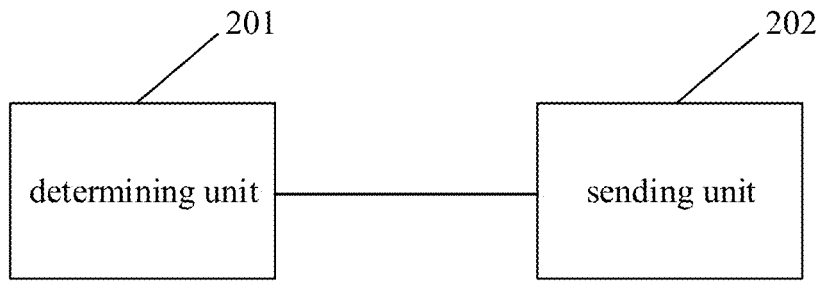
FIG. 15 is a block diagram of an apparatus for transmitting HARQ-ACK information according to one or m examples of the present disclosure.

FIG. 15 is a block diagram of an apparatus for transmitting HARQ-ACK information according to an example, where the apparatus for transmitting HARQ-ACK information is applied to a network device. Referring to FIG. 15, an apparatus 200 for transmitting HARQ-ACK information applied to a network device includes a determining unit 201 and a sending unit 202.

The determining unit 201 is configured to determine that there is a time domain resource conflict between a transmission of a first service type of HARQ-ACK information codebook and a transmission of a second service type of data information; and the sending unit 202 is configured to send a scheduling instruction configured to instruct a retransmission of the HARQ-ACK information codebook, in which the scheduling instruction includes resource information for retransmitting the HARQ-ACK information codebook.

In an implementation, the scheduling instruction is a downlink control signaling, and the downlink control signaling is scrambled through a radio network temporary indicator (RNTI) dedicated to identify a retransmission of the HARQ-ACK information codebook.

In another example, the downlink control signaling is a first dynamic scheduling instruction; and resources for retransmitting the HARQ-ACK information codebook are physical uplink control channel resources or physical uplink shared channel resources scheduled by the first dynamic scheduling instruction.

In yet another implementation, the second service type of the data information is scheduled by a second dynamic scheduling instruction.

The determining unit 201 is configured to determine that there is the time domain resource conflict between the transmission of the first service type of the HARQ-ACK information codebook and the transmission of the second service type of the data information by: determining that the time domain resource conflict between the transmission of the first service type of the HARQ-ACK information codebook and the transmission of the second service type of the data information will occur according to the second dynamic scheduling instruction.

In yet another implementation, the sending unit 202 is configured to send the scheduling instruction configured to instruct the retransmission of the HARQ-ACK information codebook by: sending the scheduling instruction configured to instruct the retransmission of the HARQ-ACK information codebook at a detection timing of a physical downlink control channel same as the second dynamic scheduling instruction; or sending the scheduling instruction configured to instruct the retransmission of the HARQ-ACK information codebook after sending the second dynamic scheduling instruction.

In yet another implementation, the second service type of the data information is scheduled by a semi-static scheduling instruction.

The determining unit 201 is configured to determine that there is the time domain resource conflict between the transmission of the first service type of the HARQ-ACK information codebook and the transmission of the second service type of the data information by: determining that there is the time domain resource conflict between the transmission of the first service type of the HARQ-ACK information codebook and the transmission of the second service type of the data information in response to receiving or scheduling the second service type of the data information.

In yet another implementation, the sending unit 202 is configured to send the scheduling instruction configured to instruct the retransmission of the HARQ-ACK information codebook by: sending the scheduling instruction configured to instruct the retransmission of the HARQ-ACK information codebook after a preset first duration, in which the first duration is greater than or equal to a duration for demodulating the second service type of the data information.

In yet another implementation, the sending unit 202 is further configured to: send duration information, in which the duration information represents information on a maximum duration for sending the scheduling instruction.

Figure 16:
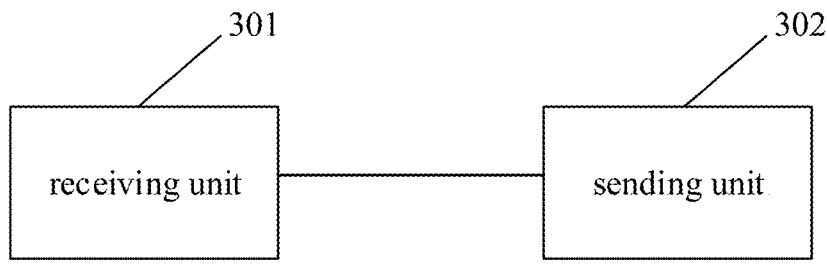
FIG. 16 is a block diagram of an apparatus for transmitting HARQ-ACK information according to one or m examples of the present disclosure.

FIG. 16 is a block diagram showing an apparatus for transmitting HARQ-ACK information according to an example, where the apparatus for transmitting HARQ-ACK information is applied to a terminal. Referring to FIG. 16, an apparatus 300 for transmitting HARQ-ACK information applied to a terminal includes a receiving unit 301 and a sending unit 302.

The receiving unit 301 is configured to receive a scheduling instruction configured to instruct a retransmission of a HARQ-ACK information codebook, in which the scheduling instruction includes resource information for retransmitting the HARQ-ACK information codebook; and the sending unit 302 is configured to retransmit the HARQ-ACK information codebook on resources indicated by the scheduling instruction.

In an implementation, the scheduling instruction is a downlink control signaling, and the downlink control signaling is scrambled through a radio network temporary indicator (RNTI) dedicated to identify a retransmission of the HARQ-ACK information codebook.

In another implementation, the downlink control signaling is a first dynamic scheduling instruction.

The sending unit 302 is configured to retransmit the HARQ-ACK information codebook by: retransmitting the HARQ-ACK information codebook on physical uplink control channel resources or physical uplink shared channel resources scheduled by the first dynamic scheduling instruction.

In yet another implementation, the second dynamic scheduling instruction is configured to schedule a second service type of data information, and the second service type of the data information is data information having a time domain resource conflict with the retransmission of the HARQ-ACK information codebook, and the HARQ-ACK information codebook is a HARQ-ACK information codebook corresponding to a first service type.

In yet another implementation, the receiving unit 301 is configured to receive the scheduling instruction configured to instruct the retransmission of the HARQ-ACK information codebook by: receiving the scheduling instruction configured to instruct the retransmission of the HARQ-ACK information codebook at a detection timing of a physical downlink control channel same as the second dynamic scheduling instruction; or receiving the scheduling instruction configured to instruct the retransmission of the HARQ-ACK information codebook after receiving the second dynamic scheduling instruction.

In yet another implementation, the second service type of the data information is scheduled by a semi-static scheduling instruction, and the second service type of the data information is data information having a time domain resource conflict with the retransmission of the HARQ-ACK information codebook, and the HARQ-ACK information codebook is a HARQ-ACK information codebook corresponding to a first service type.

In yet another implementation, the receiving unit 301 is configured to receive the scheduling instruction configured to instruct the retransmission of the HARQ-ACK information codebook by: receiving the scheduling instruction configured to instruct the retransmission of the HARQ-ACK information codebook after a preset first duration, in which the first duration is greater than or equal to a duration for demodulating the second service type of the data information.

In yet another implementation manner, the receiving unit 301 is further configured to: receive duration information in advance, in which the duration information represents information on a maximum duration for sending the scheduling instruction; and receive the scheduling instruction configured to instruct the retransmission of the HARQ-ACK information codebook within the maximum duration.

In yet another implementation manner, the sending unit 302 is further configured to: cancel the retransmission of the HARQ-ACK information codebook in response to not receiving the scheduling instruction configured to instruct the retransmission of the HARQ-ACK information codebook within the maximum duration.

Regarding the apparatus in the above-mentioned example, the specific manner in which each module performs operations has been described in detail in the example of the method, and will not be described in detail here.

Figure 17:
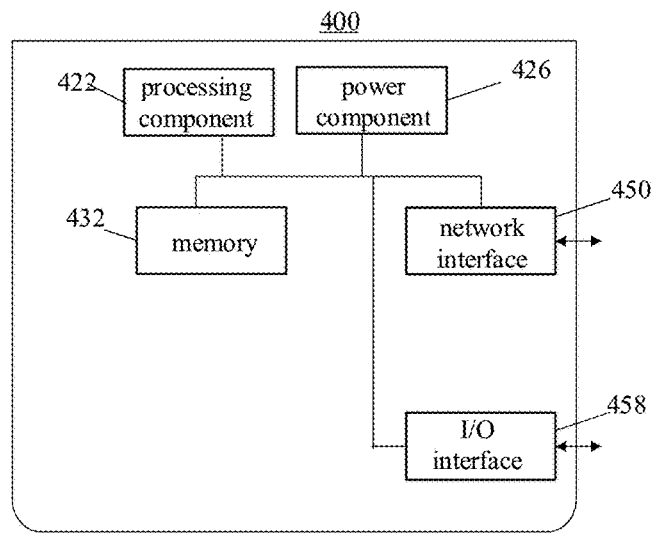
FIG. 17 is a block diagram of an apparatus for transmitting HARQ-ACK information according to one or m examples of the present disclosure.

FIG. 17 is a block diagram of an apparatus 400 for transmitting HARQ-ACK information according to an example. For example, apparatus 400 may be provided as a network device. Referring to FIG. 17, the apparatus 400 includes processing component 422, which further includes one or more processors, and a memory resource represented by memory 432 for storing instructions executable by processing component 422, such as an application program. An application program stored in memory 432 may include one or more modules, each corresponding to a set of instructions. Additionally, the processing component 422 is configured to execute instructions to perform the above-described methods.

The apparatus 400 may also include a power component 426 configured to perform power management of the apparatus 400, a wired or wireless network interface 450 configured to connect the apparatus 400 to a network, and an input output (I/O) interface 458. The apparatus 400 may operate based on an operating system stored in memory 432, such as Windows Server™, Mac OS X™, Unix™ Linux™, FreeBSD™ or the like.

In an example, a non-transitory computer-readable storage medium including instructions, such as a memory 432 including instructions, executable by the processing component 422 of the apparatus 400 to perform the method described above is also provided. For example, the non-transitory computer-readable storage medium may be ROM, random access memory (RAM), CD-ROM, magnetic tape, floppy disk, optical data storage device, and the like.

Figure 18:
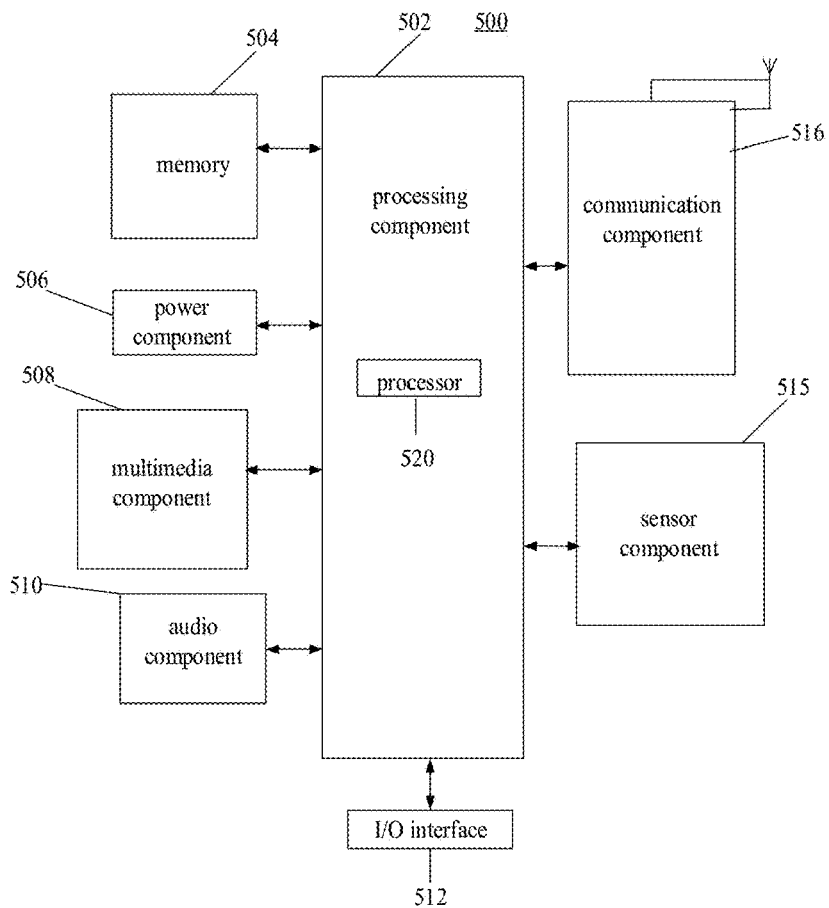
FIG. 18 is a block diagram of an apparatus for transmitting HARQ-ACK information according to one or m examples of the present disclosure.

FIG. 18 is a block diagram of an apparatus 500 for transmitting HARQ-ACK information according to an example. For example, apparatus 500 may be a mobile phone, a computer, a digital broadcast terminal, a messaging device, a game console, a tablet device, a medical device, a fitness device, a personal digital assistant terminal, etc.

Referring to FIG. 18, the apparatus 500 may include one or more of the following components: a processing component 502, a memory 504, a power component 506, a multimedia component 508, an audio component 510, an input/output (I/O) interface 512, a sensor component 515, and a communication component 516.

The processing component 502 generally controls the overall operation of the apparatus 500, such as operations associated with display, phone calls, data communications, camera operations, and recording operations. The processing component 502 may include one or more processors 520 to execute instructions to perform all or some of the steps of the methods described above. Additionally, the processing component 502 may include one or more modules to facilitate interaction between the processing component 502 and other components. For example, the processing component 502 may include a multimedia module to facilitate interaction between multimedia component 508 and the processing component 502.

The memory 504 is configured to store various types of data to support operation at the apparatus 500. Examples of such data include instructions for any application or method operating on apparatus 500, contact data, phonebook data, messages, pictures, videos, and the like. The memory 504 may be implemented by any type of volatile or non-volatile storage device or combination thereof, such as static random access memory (SRAM), electrically erasable programmable read only memory (EEPROM), erasable Programmable Read Only Memory (EPROM), Programmable Read Only Memory (PROM), Read Only Memory (ROM), Magnetic Memory, Flash Memory, Magnetic Disk or Optical Disk.

The power component 506 provides power to various components of apparatus 500. The power components 506 may include a power management system, one or more power sources, and other components associated with generating, managing, and distributing power to apparatus 500.

The multimedia component 508 includes a screen that provides an output interface between the apparatus 500 and the user. In some examples, the screen may include a liquid crystal display (LCD) and a touch panel (TP). If the screen includes a touch panel, the screen may be implemented as a touch screen to receive input signals from a user. The touch panel includes one or more touch sensors to sense touch, swipe, and gestures on the touch panel. The touch sensor may not only sense the boundaries of a touch or swipe action, but also detect the duration and pressure associated with the touch or swipe action. In some examples, the multimedia component 508 includes a front-facing camera and/or a rear-facing camera. When the apparatus 500 is in an operation mode, such as a shooting mode or a video mode, the front camera and/or the rear camera may receive external multimedia data. Each of the front and rear cameras can be a fixed optical lens system or have focal length and optical zoom capability.

The audio component 510 is configured to output and/or input audio signals. For example, audio component 510 includes a microphone (MIC) that is configured to receive external audio signals when apparatus 500 is in operating modes, such as call mode, recording mode, and voice recognition mode. The received audio signal may be further stored in memory 504 or transmitted via communication component 516. In some examples, the audio component 510 also includes a speaker for outputting audio signals.

The I/O interface 512 provides an interface between the processing component 502 and a peripheral interface module, which may be a keyboard, a click wheel, a button, or the like. These buttons may include, but are not limited to: home button, volume buttons, start button, and lock button.

The sensor assembly 515 includes one or more sensors for providing status assessment of various aspects of apparatus 500. For example, the sensor assembly 515 can detect the open/closed state of the apparatus 500, the relative positioning of components, such as the display and keypad of the apparatus 500, and the sensor assembly 515 can also detect a change in the position of the apparatus 500 or a component of the apparatus 500, the presence or absence of user contact with the apparatus 500, the orientation or acceleration/deceleration of the apparatus 500 and the temperature change of the apparatus 500. The sensor assembly 515 may include a proximity sensor configured to detect the presence of nearby objects in the absence of any physical contact. The sensor assembly 515 may also include a light sensor, such as a CMOS or CCD image sensor, for use in imaging applications. In some examples, the sensor assembly 515 may also include an acceleration sensor, a gyroscope sensor, a magnetic sensor, a pressure sensor, or a temperature sensor.

The communication component 516 is configured to facilitate wired or wireless communication between apparatus 500 and other devices. The apparatus 500 may access wireless networks based on communication standards, such as WiFi, 2G or 3G, or a combination thereof. In one example, the communication component 516 receives broadcast signals or broadcast related information from an external broadcast management system via a broadcast channel. In an example, the communication component 516 also includes a near field communication (NFC) module to facilitate short-range communication. For example, the NFC module may be implemented based on radio frequency identification (RFID) technology, infrared data association (IrDA) technology, ultra-wideband (UWB) technology, Bluetooth (BT) technology and other technologies.

In an example, the apparatus 500 may be implemented by one or more application specific integrated circuits (ASICs), digital signal processors (DSPs), digital signal processing devices (DSPDs), programmable logic devices (PLDs), field programmable A gate array (FPGA), controller, microcontroller, microprocessor or other electronic component implementation for performing the above method.

In an example, there is also provided a non-transitory computer-readable storage medium including instructions, such as a memory 504 including instructions, executable by the processor 520 of the apparatus 500 to perform the above method. For example, the non-transitory computer-readable storage medium may be ROM, random access memory (RAM), CD-ROM, magnetic tape, floppy disk, optical data storage device, and the like.

It should be understood that in the present disclosure, "plurality" refers to two or more than two, and other quantifiers are similar. The term "and/or", which describes the association relationship of the associated objects, means that there can be three kinds of relationships, for example, A and/or B, which can mean that A exists alone, A and B exist at the same time, and B exists alone. The character "/" generally indicates that the related objects are an "or" relationship. The singular forms "a," "the," and "the" are intended to include the plural forms as well, unless the context clearly dictates otherwise.

It is further understood that the terms "first", "second", etc. are used to describe various information, but the information should not be limited to these terms. These terms are only used to distinguish the same type of information from one another, and do not imply a particular order or level of importance. In fact, the expressions "first", "second" etc. are used completely interchangeably. For example, the first information may also be referred to as the second information, and similarly, the second information may also be referred to as the first information, without departing from the scope of the present disclosure.

It is further to be understood that although the operations in the examples of the present disclosure are described in a specific order in the drawings, it should not be construed as requiring that the operations be performed in the specific order shown or the serial order, or requiring Perform all operations shown to obtain the desired result. In certain circumstances, multitasking and parallel processing may be advantageous.

Other examples of the present disclosure will readily occur to those skilled in the art upon consideration of the specification and practice of the invention disclosed herein. This application is intended to cover any variations, uses, or adaptations of the present disclosure that follow the general principles of the present disclosure and include common knowledge or techniques in the technical field not disclosed by the present disclosure. The specification and examples are to be regarded as exemplary only, with the true scope and spirit of the disclosure being indicated by the following claims.

It is to be understood that the present disclosure is not limited to the precise structures described above and illustrated in the accompanying drawings, and that various modifications and changes may be made without departing from the scope thereof. The scope of the present disclosure is limited only by the appended claims.

What is claimed is:

1. A method for transmitting HARQ-ACK information, comprising:
    determining, by a network device, that a time domain resource conflict exists between transmitting a first service type of a Hybrid Automatic Repeat ReQuest Acknowledgement (HARQ-ACK) information codebook and transmitting a second service type of data information; and
    sending, by the network device, a scheduling instruction configured to instruct a retransmission of the HARQ-ACK information codebook, wherein the scheduling instruction comprises resource information for retransmitting the HARQ-ACK information codebook;
    wherein determining that the time domain resource conflict exists between transmitting the first service type of the HARQ-ACK information codebook and transmitting the second service type of the data information comprises:
    pre-determining, according to a first dynamic scheduling instruction that comprises transmission resource information of the second service type of the data information, that the time domain resource conflict between transmitting the first service type of the HARQ-ACK information codebook and transmitting the second service type of the data information will occur, wherein the second service type of the data information is scheduled by the first dynamic scheduling instruction; and
    wherein sending the scheduling instruction configured to instruct the retransmission of the HARQ-ACK information codebook comprises:
    sending the scheduling instruction configured to instruct the retransmission of the HARQ-ACK information codebook before the time domain resource conflict.

2. The method of claim 1, wherein the scheduling instruction comprises a downlink control signaling, and the downlink control signaling is scrambled through a radio network temporary indicator (RNTI) dedicated to identify the retransmission of the HARQ-ACK information codebook.

3. The method of claim 2, wherein the downlink control signaling comprises a second dynamic scheduling instruction; and
    resources for retransmitting the HARQ-ACK information codebook comprise physical uplink control channel resources or physical uplink shared channel resources scheduled by the second dynamic scheduling instruction.

4. The method of claim 1, wherein sending the scheduling instruction configured to instruct the retransmission of the HARQ-ACK information codebook comprises:
    sending the scheduling instruction configured to instruct the retransmission of the HARQ-ACK information codebook at a detection timing of a physical downlink control channel same as the first dynamic scheduling instruction.

5. The method of claim 1, wherein determining that the time domain resource conflict exists between transmitting the first service type of the HARQ-ACK information codebook and transmitting the second service type of the data information comprises:
    determining that the time domain resource conflict has already occurred between the transmission of the first service type of the HARQ-ACK information codebook and the transmission of the second service type of the data information in response to receiving or scheduling the second service type of the data information, wherein the second service type of the data information is scheduled by a semi-static scheduling instruction.

6. The method of claim 5, wherein sending the scheduling instruction configured to instruct the retransmission of the HARQ-ACK information codebook comprises:
sending the scheduling instruction configured to instruct the retransmission of the HARQ-ACK information codebook after a preset first duration, wherein the first duration is greater than or equal to a duration for demodulating the second service type of the data information.

7. The method of claim 4, further comprising:
sending duration information, wherein the duration information represents information on a maximum duration for sending the scheduling instruction.

8. A method for transmitting HARQ-ACK information, comprising:
receiving, by a terminal, a scheduling instruction configured to instruct a retransmission of a Hybrid Automatic Repeat ReQuest Acknowledgement (HARQ-ACK) information codebook before a time domain resource conflict,
wherein the scheduling instruction comprises resource information for retransmitting the HARQ-ACK information codebook,
wherein the HARQ-ACK information codebook is a HARQ-ACK information codebook corresponding to a first service type, and
a transmission of the first service type of the HARQ-ACK information codebook will have the time domain resource conflict with a transmission of a second service type of data information, wherein the time domain resource conflict is pre-determined according to a first dynamic scheduling instruction that comprises transmission resource information of the second service type of the data information by a network device, and wherein the second service type of the data information is scheduled by the first dynamic scheduling instruction; and
retransmitting, by the terminal, the HARQ-ACK information codebook on resources indicated by the scheduling instruction.

9. The method of claim 8, wherein the scheduling instruction comprises a downlink control signaling, and the downlink control signaling is scrambled through a radio network temporary indicator (RNTI) dedicated to identify the retransmission of the HARQ-ACK information codebook.

10. The method of claim 9, wherein the downlink control signaling comprises a second dynamic scheduling instruction; and
wherein retransmitting the HARQ-ACK information codebook comprises:
retransmitting the HARQ-ACK information codebook on physical uplink control channel resources or physical uplink shared channel resources scheduled by the second dynamic scheduling instruction.

11. The method of claim 8, wherein receiving the scheduling instruction configured to instruct the retransmission of the HARQ-ACK information codebook comprises:
receiving the scheduling instruction configured to instruct the retransmission of the HARQ-ACK information codebook at a detection timing of a physical downlink control channel same as the first dynamic scheduling instruction.

12. The method of claim 8, wherein receiving the scheduling instruction configured to instruct the retransmission of the HARQ-ACK information codebook comprises:
receiving the scheduling instruction configured to instruct the retransmission of the HARQ-ACK information codebook after a preset first duration, wherein the first duration is greater than or equal to a duration for demodulating the second service type of the data information;
wherein, the second service type of the data information is scheduled by a semi-static scheduling instruction.

13. The method of claim 8, further comprising:
receiving duration information in advance, wherein the duration information represents information on a maximum duration for sending the scheduling instruction; and
wherein receiving the scheduling instruction configured to instruct the retransmission of the HARQ-ACK information codebook comprises:
receiving the scheduling instruction configured to instruct the retransmission of the HARQ-ACK information codebook within the maximum duration.

14. The method of claim 13, further comprising:
cancelling the retransmission of the HARQ-ACK information codebook in response to not receiving the scheduling instruction configured to instruct the retransmission of the HARQ-ACK information codebook within the maximum duration.

15. An apparatus for transmitting HARQ-ACK information, comprising:
a processor; and
a memory for storing instructions executable by the processor;
wherein, the processor is configured to:
pre-determine according to a first dynamic scheduling instruction that comprises transmission resource information of the second service type of the data information, that a time domain resource conflict will occur between transmitting a first service type of a Hybrid Automatic Repeat ReQuest Acknowledgement (HARQ-ACK) information codebook and transmitting a second service type of data information, wherein the second service type of the data information is scheduled by the first dynamic scheduling instruction; and
send a scheduling instruction configured to instruct a retransmission of the HARQ-ACK information codebook before the time domain resource conflict, wherein the scheduling instruction comprises resource information for retransmitting the HARQ-ACK information codebook.

16. The apparatus of claim 15, wherein the scheduling instruction comprises a downlink control signaling, and the downlink control signaling is scrambled through a radio network temporary indicator (RNTI) dedicated to identify a retransmission of the HARQ-ACK information codebook.

17. A non-transitory computer-readable storage medium, wherein when instructions in the storage medium are executed by a processor of a network device, the network device is caused to execute the method for transmitting HARQ-ACK information of claim 1.

18. An apparatus for transmitting HARQ-ACK information, comprising:
a processor; and
a memory for storing instructions executable by the processor;

wherein, the processor is configured to execute the method for transmitting HARQ-ACK information of claim 9.

19. A non-transitory computer-readable storage medium, wherein when instructions in the storage medium are executed by a processor of a network device, the network device is caused to execute the method for transmitting HARQ-ACK information of claim 8.

* * * * *